(12) United States Patent
Page et al.

(10) Patent No.: US 11,674,599 B2
(45) Date of Patent: Jun. 13, 2023

(54) SEAL ASSEMBLY INCLUDING SHAPE MEMORY STIFFENING MEMBERS

(71) Applicant: The Boeing Company, Chicago, IL (US)

(72) Inventors: Nicholas Page, Ladson, SC (US); Tyler Emerson Berkey, Charleston, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/370,253

(22) Filed: Jul. 8, 2021

(65) Prior Publication Data

US 2022/0018443 A1  Jan. 20, 2022

Related U.S. Application Data

(60) Provisional application No. 63/052,174, filed on Jul. 15, 2020.

(51) Int. Cl.
*F16J 15/3284* (2016.01)

(52) U.S. Cl.
CPC .................. *F16J 15/3284* (2013.01)

(58) Field of Classification Search
CPC ....... F16J 15/162; F16J 15/164; F16J 15/3284
See application file for complete search history.

(56) References Cited

U.S. PATENT DOCUMENTS

| 5,181,341 A | 1/1993 | Keys et al. |
| 5,390,974 A | 2/1995 | Theodorakakos |
| 5,489,104 A | 2/1996 | Wolff |
| 5,899,463 A * | 5/1999 | Koch ........................ F16J 15/52 277/921 |
| 5,940,788 A | 8/1999 | Morman et al. |
| 6,394,655 B1 | 5/2002 | Schnur et al. |
| 6,683,965 B1 | 1/2004 | Sapiejewski |

(Continued)

FOREIGN PATENT DOCUMENTS

| EP | 0835805 A2 | 5/2001 |
| EP | 1914388 A1 | 4/2008 |

(Continued)

OTHER PUBLICATIONS

European Patent Office. Extended European Search Report for EP Application No. 21185337.9, dated Nov. 30, 2021, pp. 1-10.

(Continued)

*Primary Examiner* — Gilbert Y Lee
(74) *Attorney, Agent, or Firm* — Vivacqua Crane PLLC (57) ABSTRACT

A seal assembly configured to seal against a surface of a seal depressor includes a body member configured to elastically deform in at least a first direction of motion from an original state into a compressed state in response to experiencing a load. The body member exerts a sealing pressure against the surface of the seal depressor when in the compressed state. The seal assembly also includes one or more shape memory stiffening members constructed from a shape memory material having a high energy state and a low energy state. The one or more shape memory stiffening members are oriented perpendicular to the first direction of motion of the seal assembly and configured to stiffen the body member of the seal assembly when the shape memory material is in the high energy state.

20 Claims, 7 Drawing Sheets

(56) References Cited

U.S. PATENT DOCUMENTS

| | | | |
|---|---|---|---|
| 7,258,347 B2* | 8/2007 | Keefe | F16J 15/027 277/648 |
| 10,571,025 B2 | 2/2020 | Takeuchi | |
| 2003/0019160 A1 | 1/2003 | Oda et al. | |
| 2005/0198907 A1* | 9/2005 | McKnight | B60J 10/50 49/475.1 |
| 2005/0199440 A1* | 9/2005 | Keefe | F16J 15/064 181/284 |
| 2006/0125188 A1* | 6/2006 | Verbrugge | F16J 15/164 277/319 |
| 2008/0296849 A1* | 12/2008 | Alacqua | F16J 15/0893 277/593 |
| 2009/0255187 A1 | 10/2009 | Alexander et al. | |
| 2012/0286480 A1* | 11/2012 | Efremov | F16L 23/20 277/626 |
| 2013/0134679 A1 | 5/2013 | Garlapati | |
| 2014/0248120 A1 | 9/2014 | Graves | |
| 2015/0322807 A1* | 11/2015 | Budnick | F01D 9/041 277/654 |
| 2015/0353210 A1* | 12/2015 | Litwinski | C22F 1/006 148/563 |
| 2017/0191565 A1* | 7/2017 | Cheng | F16J 15/3284 |
| 2019/0331226 A1* | 10/2019 | Pritchard | F16J 15/164 |
| 2019/0338854 A1* | 11/2019 | Lee | F16J 15/164 |
| 2021/0207714 A1 | 7/2021 | Schwendenmann | |

FOREIGN PATENT DOCUMENTS

| | | |
|---|---|---|
| EP | 2116621 A2 | 11/2009 |
| FR | 2738046 B1 | 9/1997 |
| JP | H01146070 U | 10/1989 |
| JP | H0438140 A | 2/1992 |

OTHER PUBLICATIONS

Pereiro-Barcelo et al. "Ductility of high-performance concrete and very-high-performance concrete elements with Ni—Ti reinforcements," Construction and Building Materials, May 3, 2018, pp. 531-551, vol. 175, Elsevier.

* cited by examiner

SEAL ASSEMBLY INCLUDING SHAPE MEMORY STIFFENING MEMBERS

CROSS-REFERENCE TO RELATED APPLICATION

This application claims priority to U.S. Provisional Application No. 63/052,174, filed Jul. 15, 2020. The contents of the application are incorporated herein by reference in its entirety.

INTRODUCTION

The present disclosure relates to a seal assembly. More particularly, the present disclosure is directed towards a seal assembly including one or more shape memory stiffening members constructed of a shape memory material.

BACKGROUND

Seals are widely used in a variety of different applications. For example, seals may be used in various types of transportation applications. Specifically, seals may be used in various rotary, pneumatic, and hydraulic systems in a vehicle. It is to be appreciated that some seals may be especially challenging to design. A seal is often the last component of a system to be designed, however, the seal is still expected to meet multiple complex requirements. Sometimes a seal may also require application-specific properties such, for example, as a flame resistance. Furthermore, the running load, which is the amount of force per unit length required to close the structure that is being sealed, should also be considered when designing the seal. Specifically, the running load should not exceed structural limitations of the components being sealed. Additionally, the running load should also consider the maximum force that an individual is capable of imparting upon the structure as well. For example, there is a limit to the amount of force an individual is capable of exerting when closing a latch.

In one existing approach, a seal is constructed in a similar fashion as a composite material. Specifically, the seal includes varying layers of ceramic fabric and polymer material to achieve various material properties such as stiffness and flame resistance. However, there are only a few factors that may be adjusted when constructing the seal from composite materials in order to meet requirements. The factors include, but are not limited to, a number of layers, the type of material, and the size of the seal. Accordingly, designing a seal that meets all requirements simultaneously may be challenging.

SUMMARY

According to several aspects, a seal assembly configured to seal against a surface of a seal depressor is disclosed. The seal assembly includes a body member configured to elastically deform in at least a first direction of motion from an original state into a compressed state in response to experiencing a load, where the body member exerts a sealing pressure against the surface of the seal depressor when in the compressed state. The seal assembly also includes one or more shape memory stiffening members constructed from a shape memory material having a high energy state and a low energy state. The one or more shape memory stiffening members oriented are perpendicular to the first direction of motion of the seal assembly and are configured to stiffen the body member of the seal assembly when the shape memory material is in the high energy state.

In another aspect, a device including a seal depressor defining a surface and a moveable member that is configured to actuate between an opened position and a closed position is disclosed. The moveable member includes a seal assembly configured to seal against the surface of the seal depressor when the moveable member is in the closed position. The seal assembly includes a body member configured to elastically deform in at least a first direction of motion from an original state into a compressed state in response to experiencing a load. The body member exerts a sealing pressure against the surface of the seal depressor when in the compressed state. The seal assembly also includes one or more shape memory stiffening members constructed from a shape memory material having a high energy state and a low energy state. The one or more shape memory stiffening members are oriented perpendicular to the first direction of motion of the seal assembly and are configured to stiffen the body member of the seal assembly when the shape memory material is in the high energy state.

In still another aspect a method is disclosed. The method includes exerting, by a seal depressor, a load upon a body member of a seal assembly. In response to experiencing the load, the method includes elastically deforming the body member of the seal assembly in a first direction of motion from an original state into a compressed state. The body member exerts a sealing load against a surface of a seal depressor when in the compressed state. The method also includes heating one or more shape memory stiffening members to an activation temperature of a shape memory material. The one or more shape memory stiffening members are constructed from the shape memory material. In response to heating the seal assembly to the activation temperature, the method includes transitioning, by the shape memory stiffening members, from a low energy state to a high energy state. Finally, the method includes stiffening the body member of the seal assembly as the shape memory material transitions from the low energy state to the high energy state.

The features, functions, and advantages that have been discussed may be achieved independently in various embodiments or may be combined in other embodiments further details of which can be seen with reference to the following description and drawings.

BRIEF DESCRIPTION OF THE DRAWINGS

The drawings described herein are for illustration purposes only and are not intended to limit the scope of the present disclosure in any way.

DETAILED DESCRIPTION

The present disclosure is directed towards a seal assembly having a body member and one or more shape memory stiffening members. The shape memory stiffening members are constructed from a shape memory material that transitions from a martensitic or low energy state to an austenitic or high energy state at an activation temperature. The shape memory stiffening members are oriented perpendicular to a first direction of motion of the seal assembly and stiffen the body member of the seal assembly when the shape memory material is in the high energy state. The body member of the seal assembly is configured to elastically deform from an original state into a compressed state, and the shape memory stiffening members are provided for urging or causing the body member to return to the original state when the shape memory material transitions from the low energy state to the high energy state.

In an embodiment, the activation temperature of the shape memory material is selected so as to correspond to an operating temperature of an assembly when passively activated. For example, if the seal assembly is used around a thrust reverser found on the nacelle of an aircraft, then the shape memory material transitions to the high energy state and becomes stiffer when the aircraft is operating on the ground, during takeoff, or in flight. However, it is to be appreciated that the seal assembly is still pliable at temperatures lower than the activation temperature of the shape memory material, thereby allowing the thrust reverser to be closed and latched by an individual.

The following description is merely exemplary in nature and is not intended to limit the present disclosure, application, or uses.

Figure 1A:
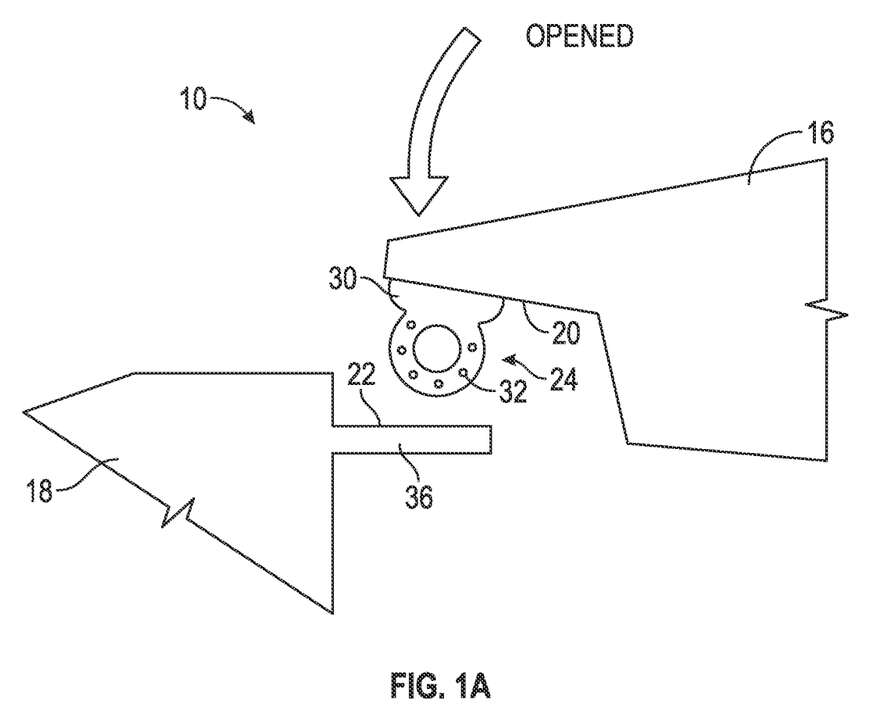
FIG. 1A illustrates a moving member, a stationary member, and the disclosed seal assembly, where the seal assembly is in an uncompressed or original state, according to an exemplary embodiment.
Figure 1B:
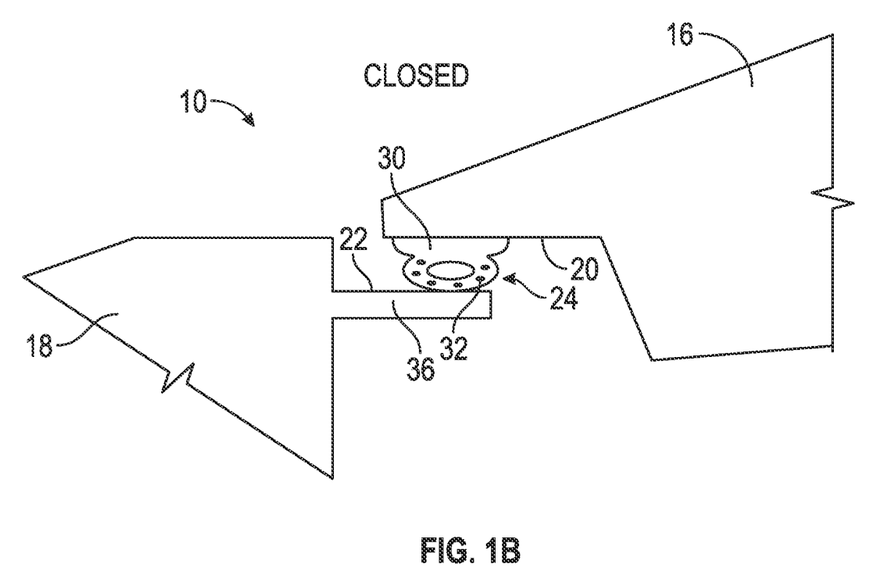
FIG. 1B illustrates the seal assembly shown in FIG. 1A in a compressed state between the moving member and the stationary member, according to an exemplary embodiment.

Referring to both FIGS. 1A and 1B, a device 10 having a moveable member 16 and a stationary member 18 is illustrated. FIG. 1A illustrates the moveable member 16 in an opened position and FIG. 1B illustrates the moveable member 16 in a closed position, where the moveable member 16 is configured to actuate between the opened position and closed position. The moveable member 16 defines a surface 20, where a seal assembly 24 is disposed along the surface 20 of the moveable member 16. As seen in FIG. 1A, the seal assembly 24 is in an uncompressed or original state when the moveable member 16 is in the opened position. The seal assembly 24 is in a compressed state when the moveable member 16 is in the closed position. Referring to FIGS. 1A and 1B, when the moveable member 16 actuates from the opened position to the closed position the surface 20 of the moveable member 16 travels towards a sealing surface 22 of the stationary member 18. The seal assembly 24 eventually contacts the sealing surface 22 of the stationary member 18 and is then compressed between the surface 20 of the stationary member 18 and the sealing surface 22 of the stationary member 18.

Figure 2:
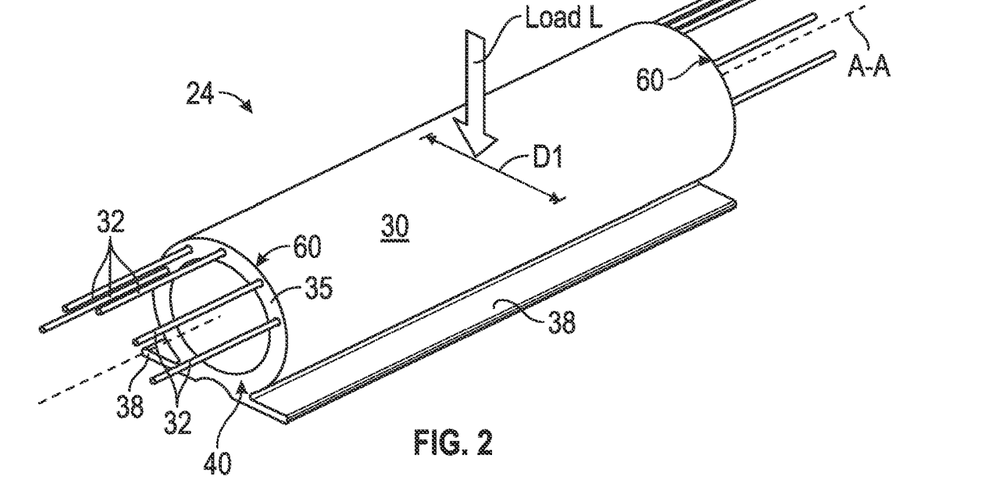
FIG. 2 is an elevated perspective view of the seal assembly shown in FIGS. 1A and 1B, where the seal assembly is in the original state, according to an exemplary embodiment.

Referring to FIGS. 1A, 1B, and 2, the seal assembly 24 includes a body member 30 and one or more shape memory stiffening members 32 that are constructed of a shape memory material. The shape memory material includes shape memory alloys, shape memory polymers, shape memory gels, and shape memory ceramics. Some examples of shape memory alloys include, but are not limited to, nickel titanium alloys or nickel copper aluminum alloys. Some examples of shape memory polymers include, but are not limited to, polytetrafluoroethylene (PFTE), polylactide (PLA), and ethylene-vinyl acetate (EVA). The shape memory material includes a low energy state and a high energy state. The low energy state may be referred to as the martensitic state and the high energy state may be referred to as the austenitic state for a shape memory alloy. As explained below, the shape memory stiffening members 32 are configured to provide stiffness to the body member 30 when the shape memory material transitions from the low energy state to the high energy state.

In one non-limiting embodiment, the moveable member 16 is a door that rotates about a hinge (not shown) between the opened position and a closed position. However, it is to be appreciated that the moveable member 16 is not limited to a door. Instead, the moveable member 16 is any member that seals against the stationary member 18. The moveable member 16, the stationary member 18, and the seal assembly 24 may be used in a variety of applications. For example, the disclosed seal assembly 24 may be a door seal for an automobile or, alternatively, a thrust reverser seal found on the nacelle of an aircraft. Furthermore, although FIGS. 1A and 1B describe a moveable member 16, in another embodiment the seal assembly 24 is used as part of a permanent seal installation. Specifically, the moveable member 16 is secured permanently in the closed position seen in FIG. 1B, and the seal assembly 24 remains compressed between the surface 20 of the moveable member 16 and the surface 20 of the stationary member 18.

Continuing to refer to FIGS. 1A and 1B, the stationary member 18 includes a seal depressor 36. The seal depressor 36 includes the sealing surface 22, where the seal assembly 24 is configured to seal against the sealing surface 22 of the seal depressor 36. In the non-limiting embodiment as shown in FIGS. 1A, 1B, and 3D, the body member 30 of the seal assembly 24 is shaped as an omega seal having a symmetrical body. That is, the body member 30 of the seal assembly 24 includes a cross-sectional profile 40 having a central loop 35 and a pair of terminal legs 38. However, it is to be appreciated that FIGS. 1A and 1B are merely exemplary in nature, and that any number cross-sectional profiles may be used as well. Furthermore, the shape memory stiffening members 32 shown in FIGS. 1A and 1B are also exemplary in nature as well.

Figure 3A:
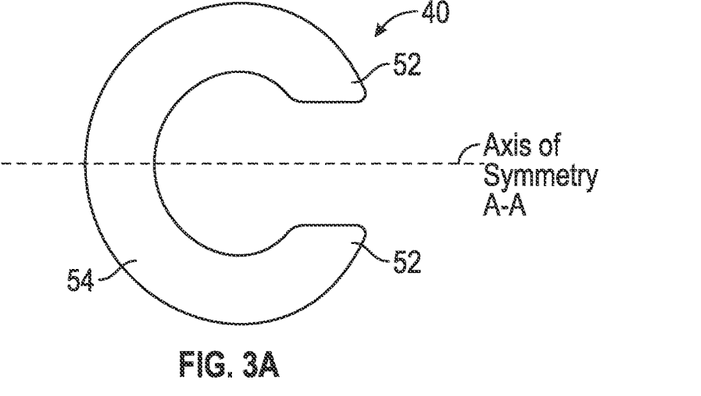
FIGS. 3A, 3B, and 3C illustrate exemplary alternative cross-sectional profiles of the seal assembly shown in FIG. 1, according to an exemplary embodiment.
Figure 3B:
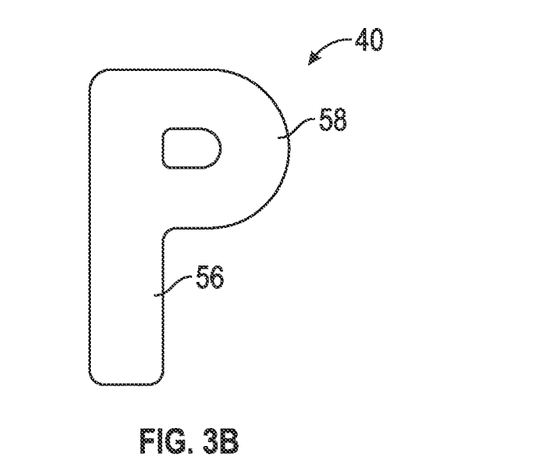
Figure 3C:
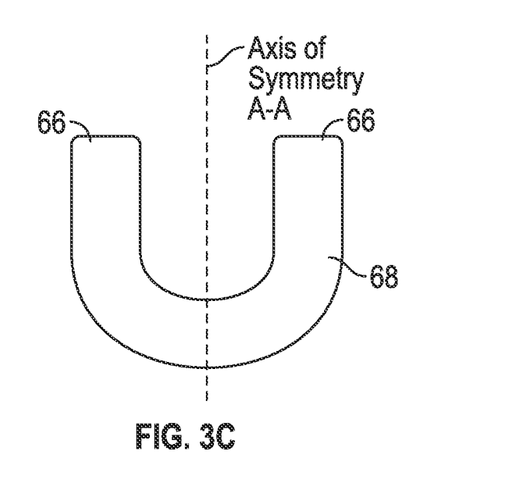
Figure 3D:
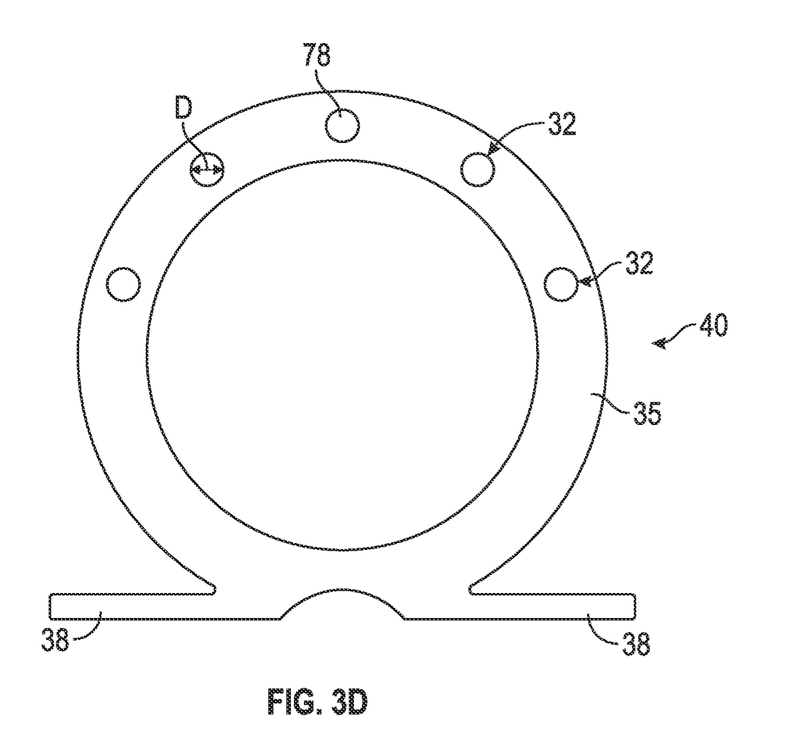
FIG. 3D is a cross-sectional profile of the seal assembly shown in FIG. 2, according to an exemplary embodiment.

FIGS. 3A, 3B, and 3C illustrate exemplary alternative cross-sectional profiles 40 of the body member 30 of the seal assembly 24. Specifically, FIG. 3A illustrates the body member 30 of the seal assembly 24 having two curved ends 52 connected to one another by an arcuate segment 54 (i.e., a C-shaped cross-sectional profile 40). In the embodiment as shown in FIG. 3B, the body member 30 of the seal assembly 24 includes a linear segment 56 connected to a rounded body end portion 58 (i.e., a P-shaped cross-sectional profile). FIG. 3C illustrates the body member 30 of the seal assembly 24 having two curved ends 66 and a linear segment 68 (i.e., a U-shaped cross-sectional profile). Furthermore, although the cross-sectional profiles 40 seen in FIGS. 2, 3A, and 3C are symmetrical and include a corresponding axis of symmetry A-A, it is to be appreciated that the seal assembly 24 may include an asymmetrical cross-section profile 40 (i.e., the cross-sectional profile shown in FIG. 3B). Some other examples of the seal assembly 24 include, but are not limited to, cup seals or ring seals that are used in hydraulic and pneumatic application, custom seals, blade seals, and block seals. Some block seals may include a grid of shape memory material.

Referring to FIG. 2, the shape memory stiffening members 32 are oriented lengthwise along the body member 30 of the seal assembly 24. In the non-limiting embodiment as shown in FIG. 2, the seal assembly 24 includes five shape memory stiffening members 32 that are spaced equidistant to one another. However, it is to be appreciated that the embodiment as shown in FIG. 2 is merely exemplary in nature, and the shape memory stiffening members 32 may be arranged into any number of configurations. The number, placement, and relative distance between the shape memory stiffening members 32 are adjusted to tune or adjust the stiffness of the seal assembly 24. For example, more shape memory stiffening members 32 may be placed closer together in areas of the seal assembly 24 that require additional stiffness.

Referring to FIG. 3D, in addition to the number, placement and relative distances of the shape memory stiffening members 32, a cross-sectional profile 78 of the shape memory stiffening members 32 also influence the stiffness of the seal assembly 24. For example, in the embodiment as shown in FIG. 3D, the shape memory stiffening members 32 include a round or circular cross-sectional profile 78, where the overall diameter D of the shape memory stiffening members 32 is adjustable to provide either more or less stiffness. However, it is to be appreciated that the shape memory stiffening members 32 are not limited to a circular cross-sectional profile 78, and may include any numbers of thicknesses, shapes, and profiles. For example, in an alternative embodiment, the shape memory stiffening members 32 include a flatted profile, similar to a ribbon (seen in FIG. 4).

FIG. 2 also illustrates the shape memory stiffening members 32 oriented parallel with the axis of symmetry A-A of the body member 30 of the seal assembly 24, where the shape memory stiffening members 32 are extruded past two end portions 60 of the body member 30 of the seal assembly 24. However, it is to be appreciated the shape memory stiffening members 32 are merely shown in this manner in FIG. 2 for illustrative purposes. That is, the shape memory stiffening members 32 actually terminate at the respective end portions 60 of the body member 30.

Figure 4:
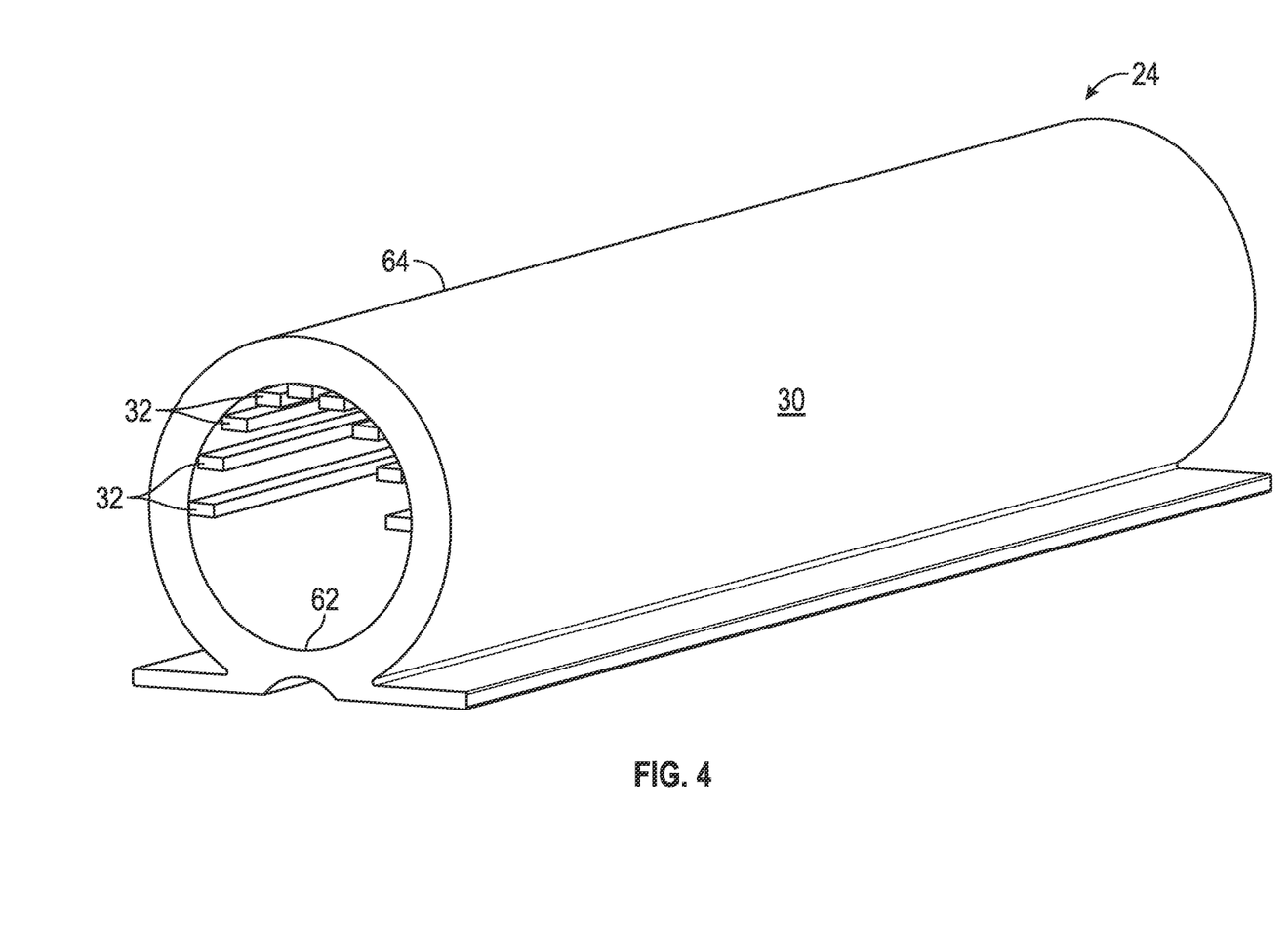
FIG. 4 is an alternative embodiment of the seal assembly shown in FIG. 2, where shape memory stiffening members not embedded within a body member of the seal assembly, according to an exemplary embodiment.

The shape memory stiffening members 32 are configured to stiffen the body member 30 of the seal assembly 24 when the shape memory material is in the high energy state. In the exemplary embodiment as shown in FIG. 2, the shape memory stiffening members 32 are completed embedded within the body member 30 of the seal assembly 24. However, in an alternative embodiment, the shape memory stiffening members 32 are only partially embedded within the body member 30 of the seal assembly. Furthermore, in the embodiment as shown in FIG. 4, the shape memory stiffening members 32 are not embedded within the body member 30 of the seal assembly 24, but instead are disposed along an inner surface 62 of the body member 30 of the seal assembly 24. Specifically, the shape memory stiffening members 32 are disposed along the inner surface 62 of the body member 30 of the seal assembly 24.

It is to be appreciated that the shape memory stiffening members 32 are only disposed along surfaces of the seal assembly 24 that do not contact the sealing surface 22 of the seal depressor 36 (FIGS. 1A and 1B). For example, in the embodiment as shown in FIG. 4, the outer surface 64 of the body member 30 of the seal assembly 24 contacts the sealing surface 22 of the seal depressor 36 (FIGS. 1A and 1B). Accordingly, the shape member stiffening members 32 are not disposed along the outer surface 64 of the body member 30 of the seal assembly 24.

Referring back to FIG. 2, the body member 30 of the seal assembly 24 is constructed of a relatively flexible material such as, but not limited to, an elastomer or a composite material. The body member 30 is configured to elastically deform in at least a first direction of motion D1 from the original state to the compressed state shown in response to experiencing a load. It is to be appreciated that the load that elastically deforms the body member 30 of the seal assembly 24 is either a dynamic load or a static load. One example of a dynamic load is the vibration created as the main engines of an aircraft spool up or spool down, or during normal operation.

In the embodiment as shown in FIG. 2, the first direction of motion D1 represents side-to-side motion. The first direction of motion D1 is perpendicular to the axis of symmetry A-A of the body member 30 of the seal assembly 24, and the shape memory stiffening members 32 are oriented perpendicular to the first direction of motion D1 and parallel with respect to the axis of symmetry A-A of the body member 30. However, it is to be appreciated that the shape memory stiffening members 32 are not limited to any specific orientation within the body member 30 of the seal assembly 24. Furthermore, as explained below, it is also to be appreciated that the body member 30 of the seal assembly 24 may elastically deform in more than one direction of motion.

Referring back to FIG. 2, during operation the seal assembly 24 is caused to move in the first direction of motion D1 when a load L is exerted upon the seal assembly 24. The load L is perpendicular the respect to the first direction of motion D1. The shape memory stiffening members 32 urge the body member 30 from the compressed state to the original state when the shape memory material transitions from the low energy state to the high energy state. Specifically, the seal assembly 24 is subjected to elevated temperatures or heated to an activation temperature of the shape memory material of the shape memory stiffening members 32, where the shape memory material transitions from the low energy state to the high energy state at the activation temperature. For purposes of this disclosure, when the shape memory material is heated, this does not necessarily require subjecting the shape memory stiffening members 32 to temperatures that are above normal room temperature, which ranges from about twenty to twenty-two degrees Celsius (68-72° F.). Instead, the activation temperature of some types of shape memory materials may be at or below room temperature. In an example, instead of being heated by the surrounding environment, the shape memory stiffening members 32 are heated based on Joule heating instead.

It is to be appreciated that the shape memory material of the seal assembly 24 is configured to revert back to the original state when the shape memory material transitions from the low energy state to the high energy state. Thus, the shape memory material is compliant at temperatures below the activation temperature but becomes rigid once the shape memory material is heated above the activation temperature. Accordingly, the seal assembly 24 stiffens and expands once heated to the activation temperature. The activation temperature of the shape memory material of the shape memory stiffening members 32 is less than an operational temperature of the device 10 (FIGS. 1A and 1B) that employs sealing assembly 24. The operational temperature represents a range of temperatures that are normally experienced by the device 10 that employs the seal assembly 24 as the device 10 is functioning. For example, in one embodiment the seal assembly 24 is part of a supercharger of an automobile with an operational temperature of about ninety to one hundred degrees Celsius, and the shape memory stiffening members 32 have an activation temperature that is below the operational temperature. In contrast, if the seal assembly 24 is part of a turbocharger of an automobile, then operational temperature is significantly more than the supercharger.

Referring to FIGS. 1B and 2, the body member 30 of the sealing assembly 24 exerts a sealing pressure against the sealing surface 22 of the seal depressor when the seal assembly 24 is in the compressed state. The seal pressure exerted by the sealing assembly 24 increases as the shape memory stiffening members 32 are heated to the activation temperature and the shape memory material transitions from the low energy state to the high energy state. Specifically, the seal assembly 24 is urged from the compressed state seen in FIG. 1B back to the original state seen in FIG. 1A when the shape memory material transitions from the low energy state to the high energy state. Accordingly, it follows that the sealing pressure exerted by the body member 30 of the seal assembly 24 upon the sealing surface 22 of the seal depressor 36 increases as the body member 30 of the seal assembly 24 is urged back to the original state. In one example, the seal assembly 24 is a door seal for a vehicle. The door seal is more pliable at room temperature, or any temperatures below the activation temperature of the shape memory stiffening members 32, but then stiffens upon reaching the activation temperature. Therefore, the running load of the door seal, which is the amount of force required to close the structure that is being sealed, remains relatively low.

Figure 5:
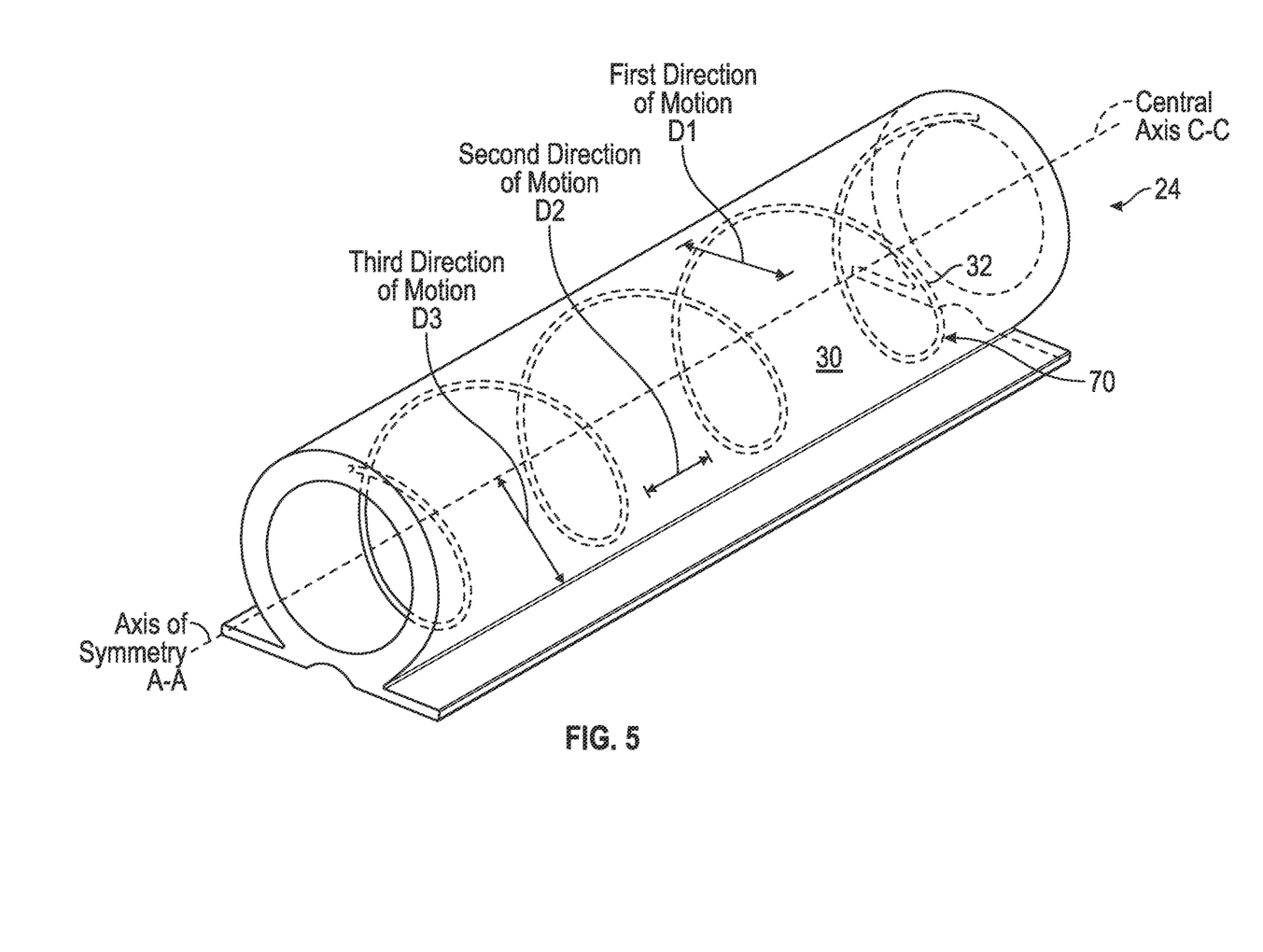
FIG. 5 is another embodiment of the seal assembly, where the shape memory stiffening members include a helix configuration, according to an exemplary embodiment.

Although FIG. 2 illustrates the shape memory stiffening members 32 providing stiffness to the body member 30 of the seal assembly 24 in one direction of motion, in another embodiment the one or more shape memory stiffening members 32 are oriented to provide stiffness to the body member 30 of the seal assembly 24 in two or more directions of motion. For example, FIG. 5 is an alternative embodiment of the seal assembly 24 shown in FIG. 2. In the embodiment as shown in FIG. 5, the one or more shape member stiffening members 32 are arranged into a helix 70. The helix 70 incudes a central axis C-C that coincides with the axis of symmetry A-A of the sealing assembly 24. The helix 70 of shape memory material is configured to provide stiffness to the body member 30 of the seal assembly 24 in three directions of motion, namely, the first direction of motion D1 (i.e., side-to-side motion), a second direction of motion D2 that is parallel with the axis of symmetry A-A, and a third direction of motion D3 that represents axial movement. Specifically, the third direction of motion D3 represents motion either radially towards or away from the axis of symmetry A-A of seal assembly 24.

Figure 6:
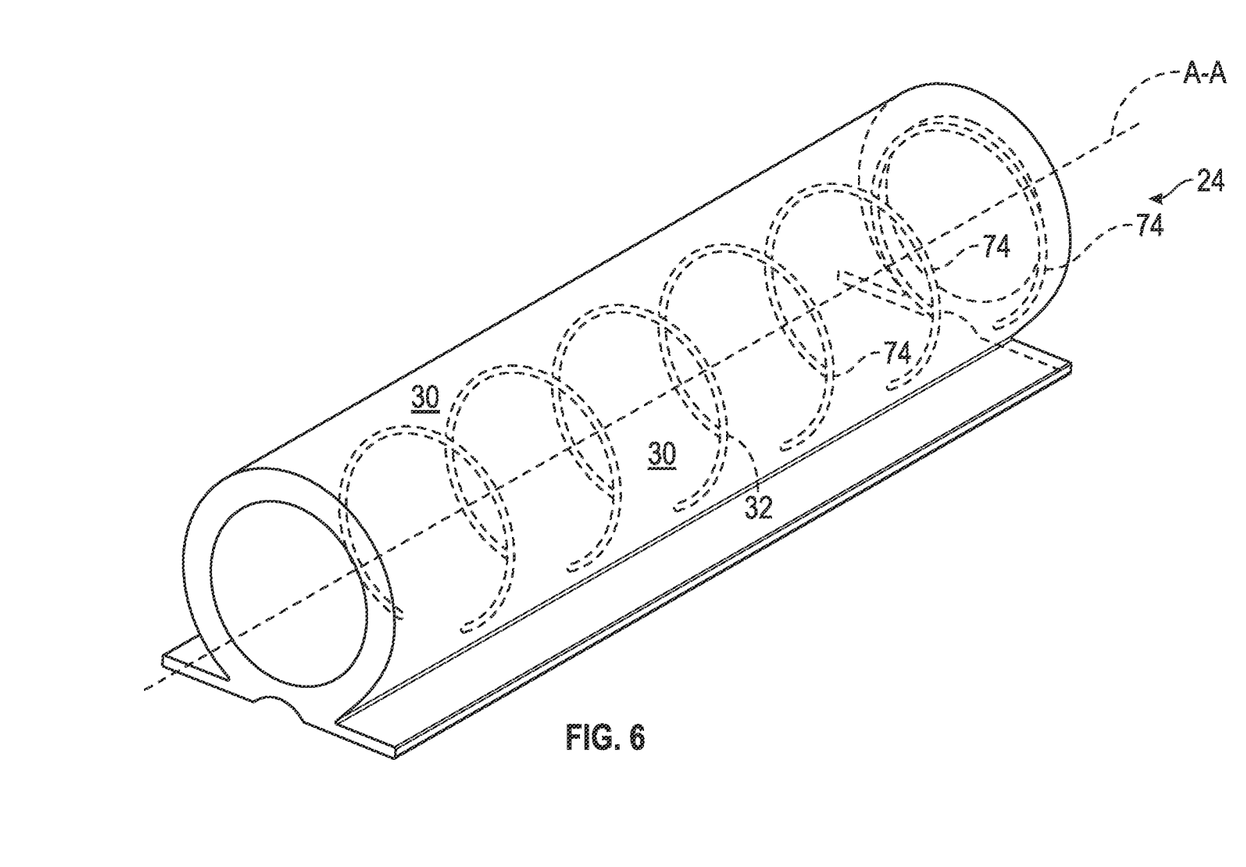
FIG. 6 is yet another embodiment of the seal assembly, where the shape memory stiffening members include a series of rings, according to an exemplary embodiment.

FIG. 6 is another embodiment of the seal assembly 24, where the shape memory stiffening members 32 are arranged as a series of rings 74. The rings 74 are oriented to exert a circumferential stiffness upon the body member 30 of the seal assembly 24 when the shape memory stiffening members 32 are in the high energy state. The series of rings 74 are configured to provide radial stiffness to the body member 30 of the seal assembly 24. It is to be appreciated that the shape memory stiffening members 32 shown in FIGS. 2, 4, 5, and 6 are merely exemplary in nature, and the shape memory stiffening members 32 are not limited to the embodiments as shown in the figures.

Figure 7:
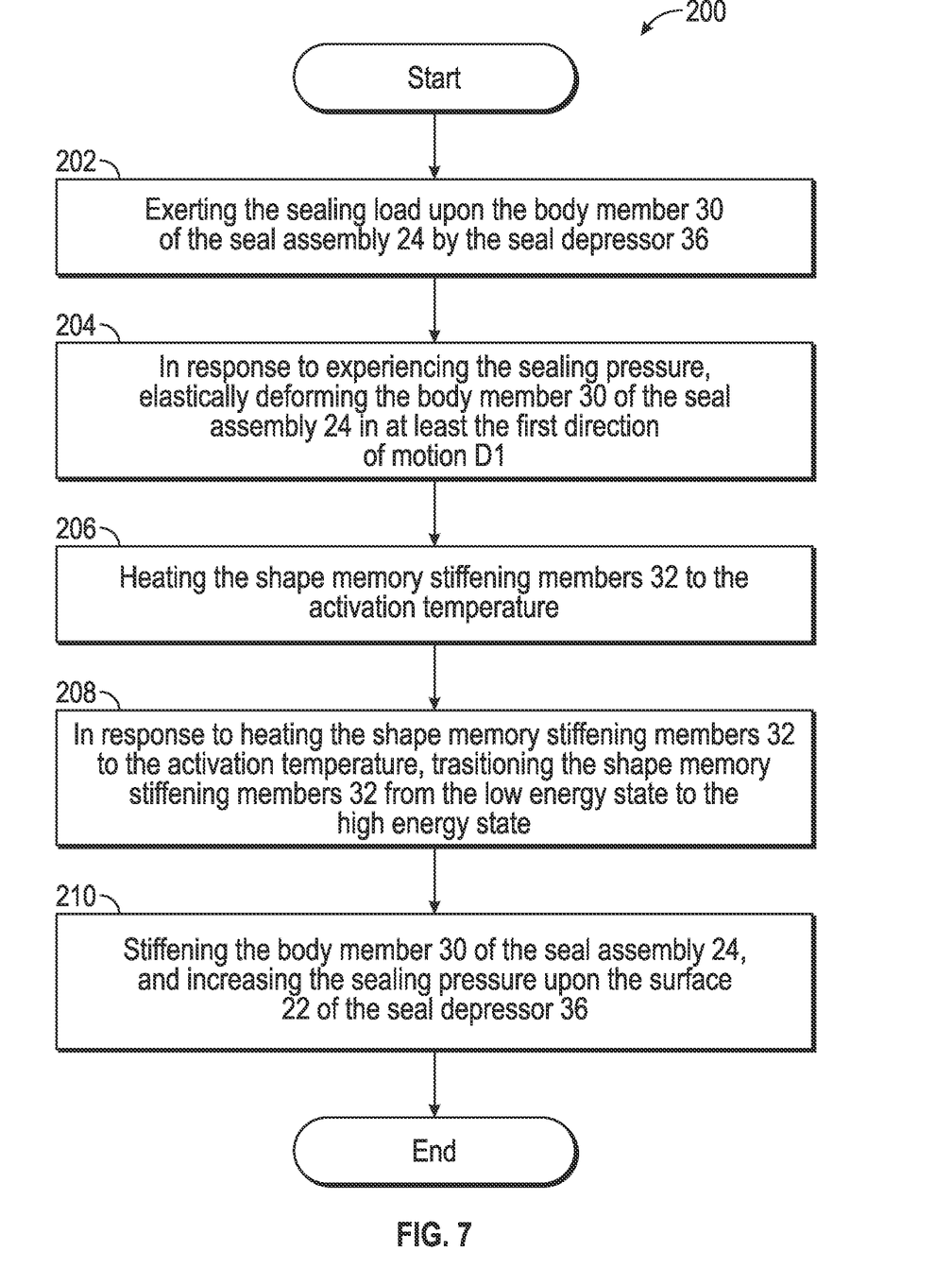
FIG. 7 is a process flow diagram illustrating a method for employing the seal assembly shown in FIGS. 1-6, according to an exemplary embodiment.

FIG. 7 is an exemplary process flow diagram illustrating a method 200 for employing the disclosed seal assembly 24. Referring to FIGS. 1-7, the method 200 begins at block 202. In block 202, the seal assembly 24 is in the compressed state, and the seal depressor 36 (FIGS. 1A and 1B) exerts the sealing load upon the body member 30 of the seal assembly 24. The method 200 may then proceed to block 204.

In block 204, in response to experiencing the sealing pressure, the body member 30 of the seal assembly 24 is elastically deformed in at least the first direction of motion D1 from the original state into the compressed state. As mentioned above, the body member 30 exerts the sealing load against the sealing surface 22 of a seal depressor 36 when in the compressed state. The method 200 may then proceed to block 206.

In block 206, the shape memory stiffening members 32 heated to the activation temperature of the shape memory material. As mentioned above, the shape memory material transitions from the low energy state to the high energy state at the activation temperature. The method 200 may then proceed to block 208.

In block 208, in response to heating the shape memory stiffening members 32 to the activation temperature, the shape memory stiffening members 32 transition from the low energy state to the high energy state. The method 200 may then proceed to block 210.

In block 210, the body member 30 of the seal assembly 24 stiffens as the shape memory material transitions from the low energy state to the high energy state. Moreover, the sealing pressure exerted by the body member 30 of the seal assembly 24 upon the sealing surface 22 of the seal depressor 36 is increased, and the body member 30 of the sealing assembly 24 is urged back to the original state. The method 200 may then terminate.

Referring generally to the figures, the disclosed seal assembly provides various technical effects and benefits. Specifically, the disclosed seal assembly is pliable when below the activation temperature of the shape memory material. Accordingly, less effort is required to perform tasks such as closing a door or latching an assembly together. However, once the seal assembly reaches the activation temperature, the seal assembly stiffens. This in turn increases the load pressure exerted upon the seal depressor as well. It is to be appreciated that shape memory materials have a wide range of activation temperatures that cause a phase change. Accordingly, the material of the shape memory composition may be tailored to accommodate a specific application.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A seal assembly configured to seal against a surface of a seal depressor, the seal assembly comprising:
   a body member configured to elastically deform in at least a first direction of motion from an original state into a compressed state in response to experiencing a load, wherein the body member exerts a sealing pressure against the surface of the seal depressor when in the compressed state; and one or more shape memory stiffening members constructed from a shape memory material having a high energy state and a low energy state, the one or more shape memory stiffening members oriented perpendicular to the first direction of motion of the seal assembly and configured to stiffen the body member of the seal assembly when the shape memory material is in the high energy state, wherein the one or more shape memory stiffening members are disposed at least partially within the body member of the seal assembly.

2. The seal assembly of claim 1, wherein the shape memory stiffening members urge the body member back to the original state when the shape memory material transitions from the low energy state to the high energy state.

3. The seal assembly of claim 2, wherein the sealing pressure exerted by the body member of the seal assembly upon the surface of the seal depressor increases as the body member is urged back to the original state.

4. The seal assembly of claim 1, wherein the first direction of motion is perpendicular with respect to an axis of symmetry of the body member of the seal assembly.

5. The seal assembly of claim 4, wherein the one or more shape memory stiffening members are oriented parallel with respect to the axis of symmetry.

6. The seal assembly of claim 1, wherein the one or more shape memory stiffening members are a series of rings that exert a circumferential stiffness upon the body member of the seal assembly when the shape memory material is in the high energy state.

7. The seal assembly of claim 1, wherein the one or more shape memory stiffening members are arranged into a helix having a central axis.

8. The seal assembly of claim 7, wherein the central axis of the helix coincides with an axis of symmetry of the body member of the seal assembly.

9. The seal assembly of claim 1, wherein the shape memory material transitions from the high energy state to the low energy state at an activation temperature.

10. The seal assembly of claim 1, wherein the shape memory material is at least one of a shape memory alloy and a shape memory polymer.

11. The seal assembly of claim 1, wherein the one or more shape memory stiffening members are completed embedded within the body member of the seal assembly.

12. A device, comprising:
a seal depressor defining a surface; and
a moveable member that is configured to actuate between an opened position and a closed position, wherein the moveable member includes a seal assembly configured to seal against the surface of the seal depressor when the moveable member is in the closed position, the seal assembly comprising:
a body member configured to elastically deform in at least a first direction of motion from an original state into a compressed state in response to experiencing a load, wherein the body member exerts a sealing pressure against the surface of the seal depressor when in the compressed state; and
one or more shape memory stiffening members constructed from a shape memory material having a high energy state and a low energy state, the one or more shape memory stiffening members oriented perpendicular to the first direction of motion of the seal assembly and configured to stiffen the body member of the seal assembly when the shape memory material is in the high energy state, wherein the one or more shape memory stiffening members are disposed at least partially within the body member of the seal assembly.

13. The device of claim 12, wherein the shape memory material transitions from a high energy state to a low energy state at an activation temperature.

14. The device of claim 13, wherein an activation temperature of the shape memory material of the shape memory stiffening members is less than an operational temperature of the device.

15. The device of claim 12, wherein the shape memory stiffening members urge the body member back to the original state when the shape memory material transitions from the low energy state to the high energy state.

16. The device of claim 12, wherein the sealing pressure exerted by the body member of the seal assembly upon the surface of the seal depressor increases as the body member is urged back to the original state.

17. The device of claim 12, wherein the one or more shape memory stiffening members are a series of rings that exert a circumferential stiffness upon the body member of the seal assembly when the shape memory material is in the high energy state.

18. The device of claim 12, wherein the one or more shape memory stiffening members include a helix having a central axis.

19. A method, comprising:
exerting, by a seal depressor, a load upon a body member of a seal assembly;
in response to experiencing the load, elastically deforming the body member of the seal assembly in a first direction of motion from an original state into a compressed state, wherein the body member exerts a sealing load against a surface of a seal depressor when in the compressed state;
heating one or more shape memory stiffening members to an activation temperature of a shape memory material, wherein the one or more shape memory stiffening members are constructed from the shape memory material, wherein the one or more shape memory stiffening members are disposed at least partially within the body member of the seal assembly;
in response to heating the seal assembly to the activation temperature, transitioning, by the shape memory stiffening members, from a low energy state to a high energy state; and
stiffening the body member of the seal assembly as the shape memory material transitions from the low energy state to the high energy state.

20. The method of claim 19, further comprising:
increasing a sealing pressure exerted by the body member of the seal assembly upon the surface of the seal depressor as the body member of the sealing assembly is urged back to the original state.

* * * * *